US006206285B1

(12) United States Patent
Baitz et al.

(10) Patent No.: US 6,206,285 B1
(45) **Date of Patent: *Mar. 27, 2001**

(54) PERIPHERAL ASSEMBLY KIT FOR THE WORKSTATION OF A GOODS INVOICING SYSTEM

(75) Inventors: Günter Baitz, Berlin; Joachim Burchart, Schlangen; Hartmut Kamin, Berlin, all of (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/125,699

(22) PCT Filed: Oct. 1, 1996

(86) PCT No.: PCT/EP96/04290

§ 371 Date: Apr. 26, 1999

§ 102(e) Date: Apr. 26, 1999

(87) PCT Pub. No.: WO97/31346

PCT Pub. Date: Aug. 28, 1997

(51) Int. Cl.[7] .............................. G06K 5/00; G06K 15/00
(52) U.S. Cl. .............................................. 235/380; 235/383
(58) Field of Search .............................. 235/7 R, 22, 380, 235/383; 705/16, 23, 24; 902/22, 30; 361/680; 177/180, 238

(56) References Cited

U.S. PATENT DOCUMENTS

| | | | | |
|---|---|---|---|---|
| 4,208,081 | | 6/1980 | Kekas et al. | 235/146 |
| 5,177,345 | * | 1/1993 | Baitz | 235/383 |
| 5,191,749 | * | 3/1993 | Cappi et al. | 235/383 |
| 5,475,207 | * | 12/1995 | Bobba et al. | 235/383 |
| 5,834,708 | * | 11/1998 | Svetal et al. | 177/180 |
| 6,037,548 | * | 3/2000 | Baitz et al. | 177/25.13 |

FOREIGN PATENT DOCUMENTS

| | | |
|---|---|---|
| 91 17 108 U1 | 12/1995 | (DE) . |
| 0 283 241 | 9/1988 | (EP) . |
| 0 349 997 | 1/1990 | (EP) . |
| 0 380 082 | 8/1990 | (EP) . |
| 0 577 170 A1 | 1/1994 | (EP) . |
| WO 79/00514 | 8/1979 | (WO) . |
| WO 90/00304 | 1/1990 | (WO) . |

* cited by examiner

*Primary Examiner*—Michael G Lee
*Assistant Examiner*—Larry Taylor
(74) *Attorney, Agent, or Firm*—Schiff Hardin & Waite

(57) ABSTRACT

A peripheral device kit for the workstation of a goods invoicing system in which a display and input unit can be mounted either on a printer box or on a base box.

14 Claims, 4 Drawing Sheets

(b)

(a)

PERIPHERAL ASSEMBLY KIT FOR THE WORKSTATION OF A GOODS INVOICING SYSTEM

BACKGROUND OF THE INVENTION

1. Field of the Invention

The present invention relates, generally, to a workstation of a goods invoicing system and, more specifically, to a peripheral device kit for the workstation of a goods invoicing system in which a display and input unit can be mounted either on a printer box or on a base box.

2. Description of the Prior Art

Depending on the application, a workstation of a goods invoicing system for shops is subject to various requirements in terms of its equipment and ease of use. In the following text, the term "workstation" covers both self-service stations used by a customer as well as equipment operated by assistants, such as cash registers, self-service weighing machines, assistant-operated weighing machines and weighing machines for packing and the like which may be free-standing or integrated in a so-called checkout point. For example, self-service weighing machines in fruit and vegetable sections and assistant-operated weighing machines are operated by a person who is standing, whereas a checkout assistant in a shop uses a cash register and an associated checkout weighing machine while sitting down. Up to now, specially designed workstations for the various applications have been used, or independent modules, whose dimensions or shapes frequently do not match one another, have been installed as desired without any spatial relation to one another. In so doing, ergonomic design principles are often followed relatively incompletely.

EP-A-0 380 082 discloses a workstation of a goods invoicing system which includes a casing with a weighing plate on its top side, a display device, an input device, a goods invoicing computer and a printer for cash register slips and/or price labels. The aforementioned peripheral devices are accommodated in a single casing and permanently are associated with one another.

U.S. Pat. No. 4,208,081 describes a data acquisition terminal includes a base casing and a keypad unit. The two can be combined or operated separately from one another. The base casing has a recess containing vertical guides and a plug connector, while corresponding guides and a mating plug are provided on the keypad unit. If the keypad unit is to be operated separately from the base casing, an additional cable must be used for their electrical connection as well as a cover for the recess which is then open.

EP-A-0 349 997 describes a cash register with a console-type casing incorporating a keypad, a display device and a printer. The display device is accommodated in a casing part which protrudes beyond the console surface in the shape of a lens and whose front side forms an obtuse angle with the keypad.

The desire for equipment for individual applications relates to manual input means and displays, recording devices for machine-readable information and physical properties of goods. Alternatively, there is a desire for equipment with various storage and identification media, such as drives for floppy disks or CD-ROM, connections for electronic, electro-optical or electromechanical bulk storage devices, for example complying with the PCMCIA standard, and readers for magnetic-strip or chip cards, which can be used to identify an operator or a service technician at the workstation. Each equipment variant would require the structure of an accommodating casing to be changed. Various additional structures make a workstation more expensive, however.

An object of the present invention, therefore, is to propose a peripheral device kit for the workstation of a goods invoicing system which can be used to adapt such a workstation to various application conditions.

SUMMARY OF THE INVENTION

The present invention is based on consideration of the fact that, although a self-service workstation, such as a self-service weighing machine, is used by a large number of people, they use it only from time to time. In this case, the manual input means and displays have to be arranged at a height where the user can read them, and at the same time close to the exit point for printed matter from a label printer so that the user will also spot a label which is dispensed. The weighing machine itself should be installed at table height, however. The same applies to assistant-operated weighing machines. On the other hand, a workstation which is used while sitting down, such as a cash register, requires the manual input means and displays, a cash register slip printer and a checkout weighing machine to be located in a closely confined viewing and handling area, in order to make it possible to work for several hours without tiring.

The arrangement of the manual input means and displays in an independent display and input unit, which can be mounted either on a weighing machine or a printer box, satisfies the requirements of both of the workstation types mentioned above. This also applies with respect to label and cash register slip printers which are constructed in a completely different way, on account of their different manner of operation, but for which it is possible to use a single opening for printed matter.

The option of equipment either with various keypads or else with a combined display/input device makes it possible not only to design a weighing machine for shops so that it is application-specific, but also to adapt it later in a simple manner when this is required by a change of application or new input devices. For example, the use of a flat screen with a so-called touch-screen or pen-computer surface or with soft keys opens up new possibilities for use in the field of both assistant-operation and self-service.

Thus, the present invention makes it possible to use, in a simple manner, for example on a weighing machine used as an assistant-operated weighing machine, a keypad which can be operated quickly, has relatively few keys and a perceptible action point, and which can be operated blind. The cash register keypad, or a second keypad which can be operated in parallel with the latter and has an identical set of keys, could be arranged upstream of a weighing machine used as a checkout weighing machine. On the other hand, in a particularly advantageous manner, a self-service weighing machine can have a touch screen representing the goods on sale by means of pictures. The goods to be weighed are identified simply by touching the appropriate picture on the screen.

Similar options for selecting the equipment of the workstation arise for storage means which have to be used only infrequently, such as floppy disk drives for loading programs, CD-ROM drives for operating a PLU store, chip card readers for registering operators or service technicians, bulk storage devices complying with the PCMCIA standard for electronic journals, etc.

If the goods invoicing computer is installed in the base box, as proposed as a preferred embodiment of the present invention, and if the display and operating unit is mounted on the base box, the storage means connected to the goods invoicing computer can be accommodated particularly advantageously in the display and operating unit. On the other hand, a single PLU store is often sufficient in a self-service workstation. A perforation should always be provided in the casing of the display and operating unit for installing such devices, and perforations which are not used should be sealed for safety reasons. This requirement is satisfied by covering these perforations with the area of the keypad surface which is bent downward. At the same time, the devices are rendered inaccessible to unauthorized persons.

A bearing fixture can be mounted on the base station. This serves for additionally locating an arrangement of further peripheral devices, such as a vertical scanner covering the space above the weighing plate from the side. The bearing fixture is at the same time used for covering a plug panel on the back of the base box. This enables cables to be guided from this point through hollow bars of the bearing fixture to a peripheral device attached to the latter so that the cables are covered. In addition, it is possible to mount, on the upper end of the bearing fixture, a supporting fixture having a bearing plate protruding beyond the base station at a distance for either the printer box on its own or with an input unit mounted. This ensures that the elements of the peripheral device kit are permanently associated with one another in spatial terms.

Additional features and advantages of the present invention are described in, and will be apparent from, the Detailed Description of the Preferred Employments and the Drawings.

DETAILED DESCRIPTION OF THE PREFERRED EMBODIMENTS

Figure 1:
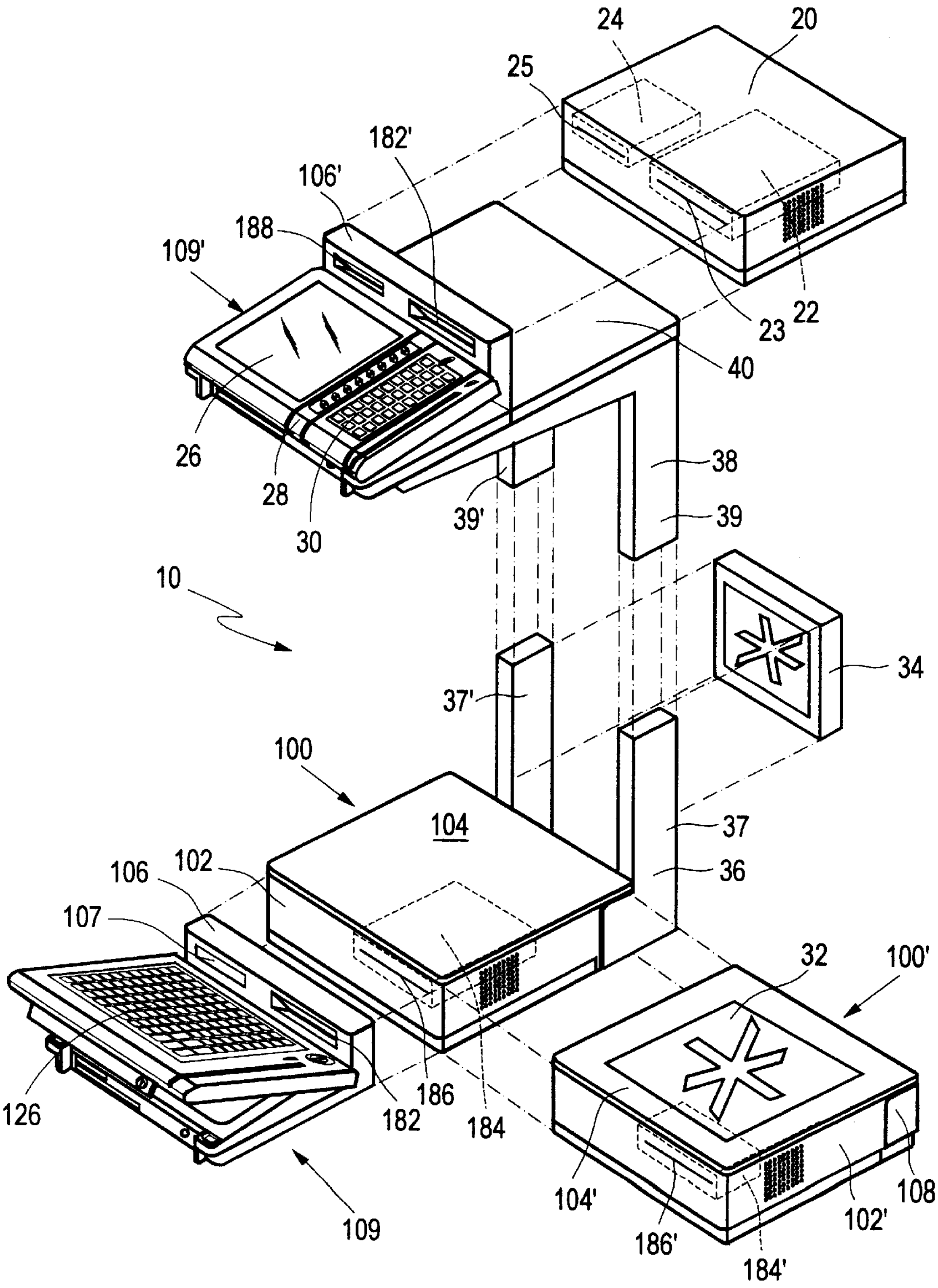
FIG. 1 shows a peripheral device kit for the workstation of a goods invoicing system in a perspective exploded view.

FIG. 1 assigns the general designation 10 to a peripheral device kit for the workstation of a goods invoicing system. It includes a printer box 20, a vertical scanner 34, a bearing fixture 36, a supporting fixture 38, a base station 100 with a base box 102 and a weighing plate 104 or a weighing plate 104', in which the window 32 of a bar code reader is inset, and a display and operating unit 109.

A cash register slip printer 22, with an exit point 23 for printed matter penetrating the front panel, and a label printer 24, with an exit point 25 for printed matter penetrating the front panel of the printer box 20, are installed behind the front panel of the cuboid printer box 20. Depending on the application of the workstation, it is also possible to install only one of the two printers in the printer box 20.

The bearing fixture 36 can be mounted on the rear of the base box 102. It includes two mutually parallel upright bars 37, 37' which are connected to one another at the back of the base box 102 by means of a cross bracket which is not shown. The vertical scanner 34 can be attached between these bars 37, 37'. The supporting fixture 38 can be mounted on the bars 37, 37'. The supporting fixture includes a horizontal mounting surface 40 for the printer box 20 which can have a display and operating unit 109' mounted on it in a design variant. Second bars 39, 39' are integrally formed on the underside of the mounting surface 40 and can be fitted on top of the bars 37, 37' of the bearing fixture 36.

Figure 2:
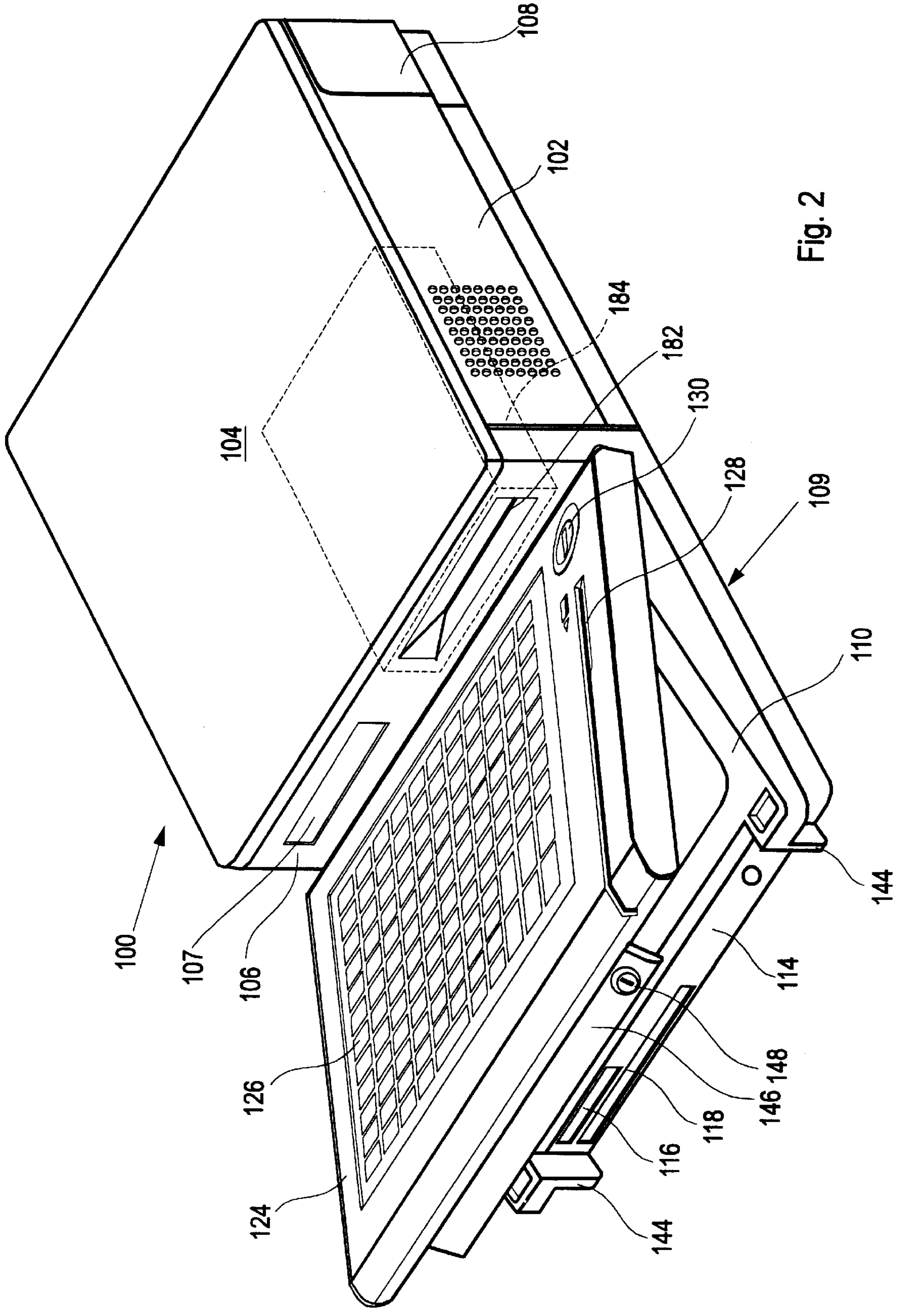
FIG. 2 shows the base station from FIG. 1 with a display and operating unit mounted in a perspective front view.

FIG. 2 shows the base station 100 in a perspective front view. This includes the base box 102 which has the weighing plate 104 mounted on its top side. A printer 184 with an exit point 186 for printed matter penetrating the front panel of the base box 102 is installed in the base box 102. A plug panel which is located to the rear of the base box 102 and cannot be seen is closed off by a removable cable cover 108. As described above, instead of the cable cover 108 on the base box 102, it is also possible to attach the bearing fixture 36 (FIG. 1) whose cross bracket then covers the plug panel. The electrical connection lines for the printer box 20, the display and operating unit 109' and the vertical scanner 34 can be guided out of sight through the hollow bars 37, 37', 39, 39' to the plug panel of the base box 102.

The display and operating unit 109 is mounted on the front of the base box 102. An information panel 106, turned toward a user on the display and operating unit 109, is fitted with a snap-fit display device 107. An opening 182 for printed matter is inset in the information panel 106 next to this in alignment with the exit point 186 for printed matter from the printer 184.

Figure 3:
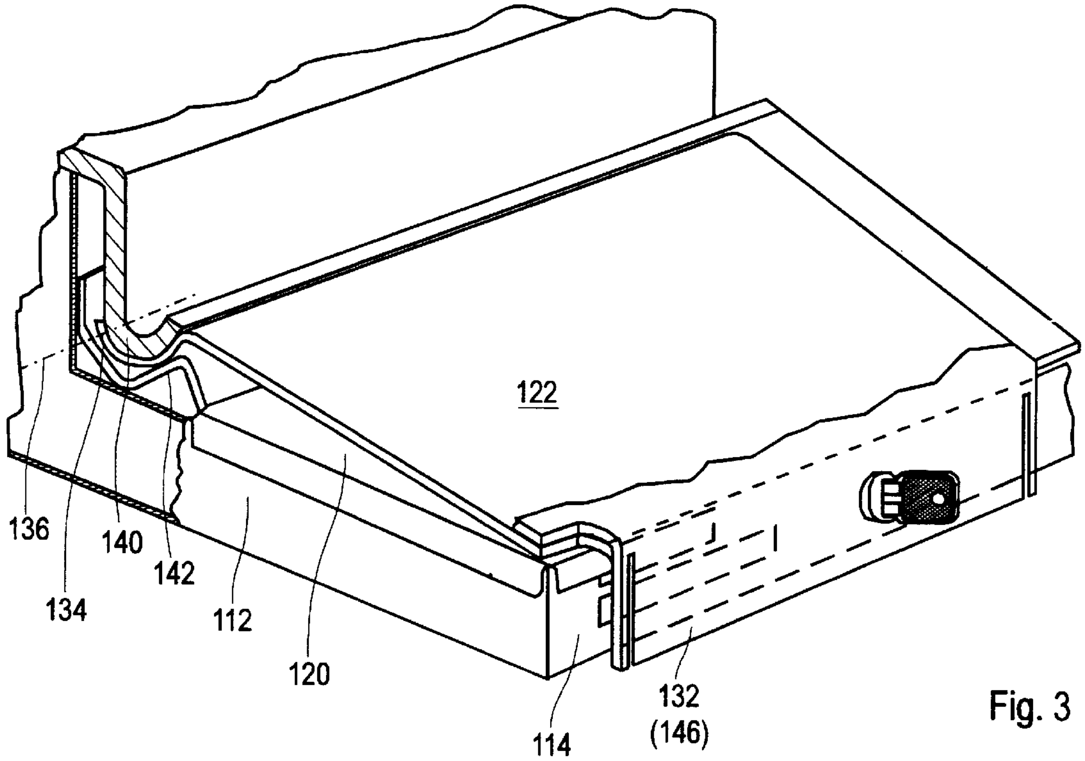
FIG. 3 shows the display and operating unit from FIG. 2 without a keypad in a sectional perspective partial view.

As shown in FIG. 3, the top side 110 of the display and operating unit 109 slopes downward toward the front. The display and operating unit 109 encompasses a metal casing 112 which has a chip card reader 116 and a floppy disk drive 118 installed in its vertical front panel 114. The top side of the casing 112 forms a cover plate 120 which has a keypad surface 122, likewise made of sheet metal, arranged so that it can pivot above it. This keypad surface has a keypad casing 124 attached to it which accommodates a keypad 126, a swipe magnetic-card reader 128 and a service lock 130. The latter is connected to a switching device which is known per se and is therefore not shown, and which at a service setting identifies an employee or commissioned service technician of the shop with respect to a control device of the workstation which is likewise not illustrated.

Figure 4:
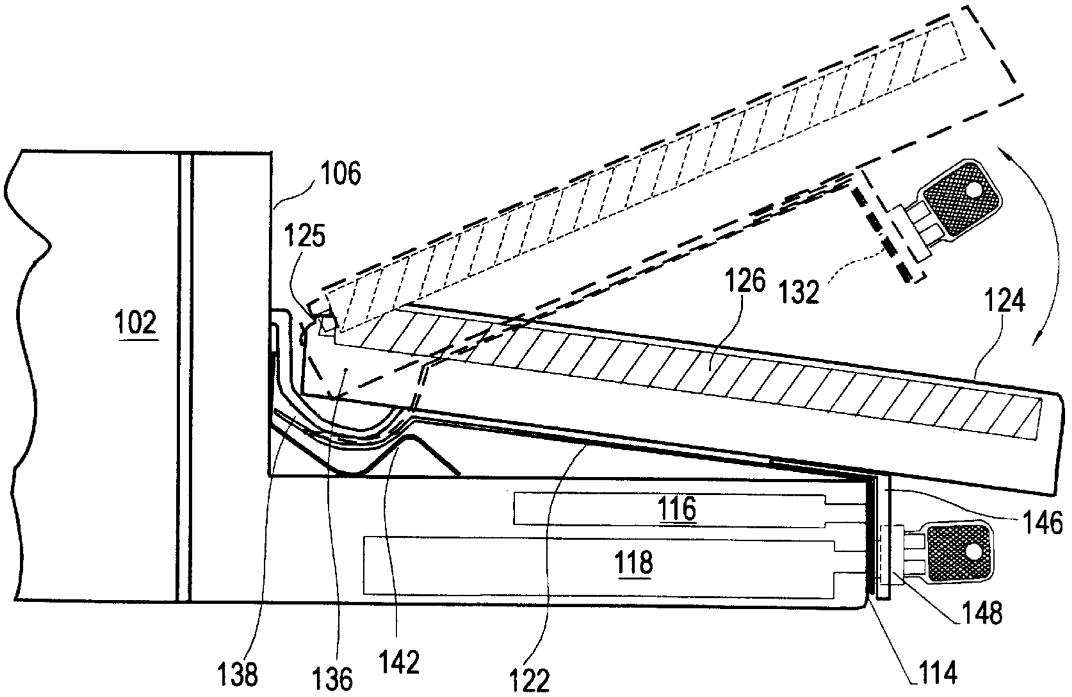
FIG. 4 shows the display and operating unit shown in FIG. 2 with a keypad in two positions in a schematic side view.

A front area 132 of the keypad surface 122 which protrudes beyond the casing 112, is bent downward so that it comes to rest in front of the front panel 114 of the casing 112 and covers it completely. The rear area of the keypad surface 122 is bent downward to form a channel 134 extending over its entire width and includes a cross section in the form of a segment of a circle. The center line of the channel 134 coincides with a pivot axis 136 about which the keypad surface 122 can pivot. The channel 134 is held in a gap 138 between the cover plate 120 and a rib 140 which is integrally formed on the information panel 106 and whose contact surface with the keypad surface 122 is matched to the shape of the channel 134; i.e., a segment of a circle. In the contact area of the channel 134, the cover plate 120 may be even. The keypad surface 122 can be made to pivot about the pivot axis 136 even better, however, if the cover plate 120 is formed into an undulation 142 in this area (FIGS. 3 and 4). In this case, the channel 134 lies in a trough of the undulation. In each pivot position, there is electrical contact over a large surface between the keypad surface 122 and the cover plate 120 so that the connection of the keypad surface 122 to the ground potential of the casing 112 is always guaranteed.

FIG. 4 shows the keypad surface 122 together with the keypad casing 124 attached to it in a lowered position, illustrated by solid lines, and a raised position, illustrated by dashed lines. In the former position, the front area 132 of the keypad surface 122 covers the front panel 114 and thus prevents access to the chip card reader 116 incorporated in this panel and to the floppy disk drive 118. In addition, FIG. 4 shows that the pivot axis 136 of the keypad surface 122 is so far in front of the information panel 106 that the rear edge 125 of the keypad casing 124 does not collide with the information panel 106 or with elements incorporated in it in any position.

The front area 132 of the lowered keypad surface 122 is located between projections 144 which are integrally formed at the front on the forepart 102 (FIG. 2). A screen 146 fitted to the front area 132 (FIG. 4) terminates at the front flush with the projections 144, which results in a device having no projections getting in the way. The screen 146 incorporates a lock 148 which also penetrates the front area 132 of the keypad surface 122 and can be used to lock the keypad surface 122 to the front panel 114. This can reliably prevent unauthorized access to the chip card reader 116 or the floppy disk drive 118.

Figure 5:
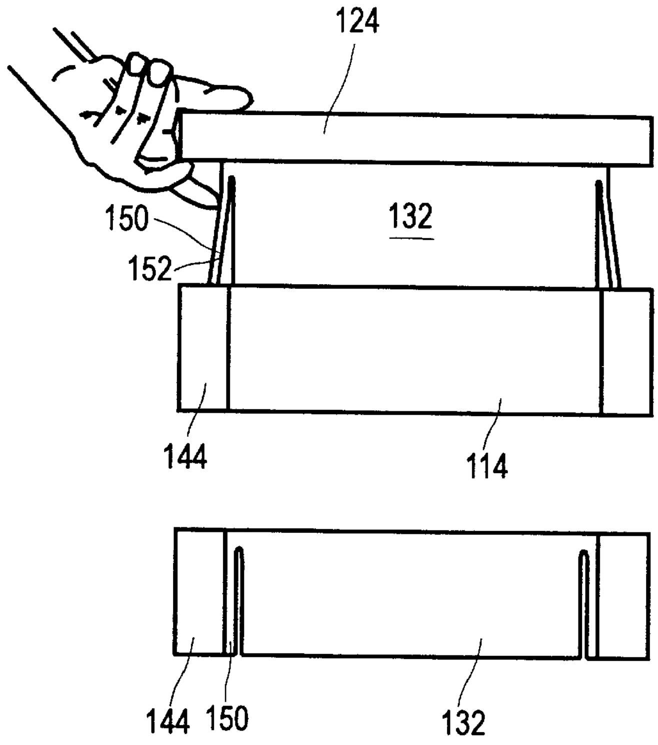
FIG. 5 shows a preferred embodiment of a keypad surface supporting device in a front view, (a) in the lowered position, and (b) in the raised position.

FIGS. 4 and 5 illustrate two different exemplary embodiments of a supporting device for the keypad surface 122. This is used, on the one hand, to hold the keypad surface 122 in its raised position so that devices incorporated in the front panel 114 of the casing 112 (in the exemplary embodiment shown in FIG. 1, these are the chip card reader 116 and the floppy disk drive 118) can be operated comfortably. On the other hand, the keypad surface 122 is prevented from striking the casing 112 hard when it is being lowered, which could lead to a magnetic disk drive, which is also installed in the casing 112 a being destroyed.

FIG. 5 shows a first exemplary embodiment of a supporting device for the keypad surface 122 (a) in the lowered position, and (b) in the raised position. Integrally formed on the side edges of the front area 132, which is bent away, of the keypad surface 122 there is a support 150 projecting obliquely with respect to the side at an angle of approximately 10°. When the keypad surface 122 is in the raised position, its lower end 152 is supported on the adjacent projection 144. In order to lower the keypad surface 122, the operator has to grasp the sides of the keypad casing 124 attached to it with both hands (shown for one side in FIG. 5*b*) and press the supports 150 toward one another with a free finger until they are in parallel alignment with the adjacent projection 144. The keypad surface 122 can then be guided downward. During the lowering, the supports 150 slide along the projections 144 with increased frictional resistance caused by the action of an elastic restoring force from the supports which have been bent to the side. This ensures that the keypad surface 122 can be changed from the raised position to the lowered position (FIG. 5*a*) without much impact.

Figure 6:
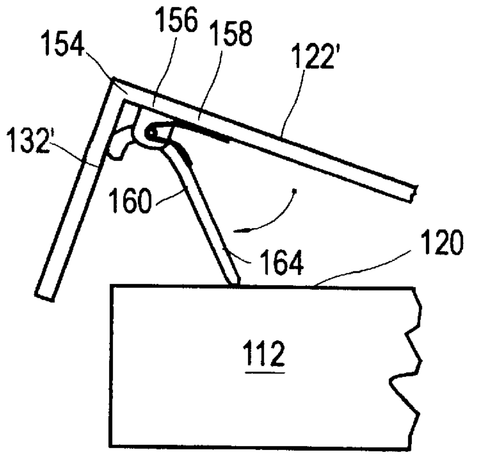
FIG. 6 shows an alternative embodiment of a keypad surface supporting device in a sectional side view, (a) in the lowered position, and (b) in the raised position.
Figure 6:
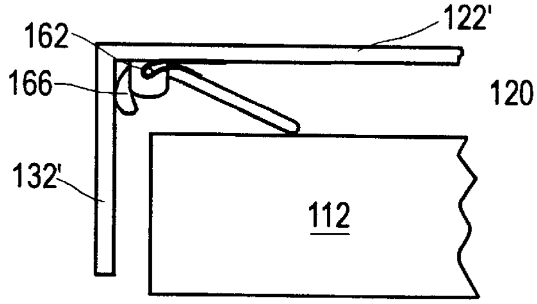

FIG. 6 shows a second exemplary embodiment of a supporting device for a keypad surface 122' (a) in the lowered position, and (b) in the raised position. On the side of the keypad surface 122' which faces the casing 112, a bracket 156 is integrally formed to the right and left in the vicinity of the edge of the bend 154 about which the front area 132' of the keypad surface 122' is bent downward. These brackets hold a support lever 160 which has two arms, is acted upon by the force of a leg spring 158 in the direction of the casing 112, and can be pivoted about a spindle 162 oriented parallel to the pivot axis 136 of the keypad surface 122'. A first limb 164 of the support lever 160 is supported on the cover plate 120 of the casing 112, and the second limb 166 is bent downward. The limbs 164, 166 form an angle of approximately 60°.

In its lowered position (FIG. 6*a*), the keypad surface 122' is retained by a latch 168 (FIG. 7) described further below. When this latch is released, the support lever 160 becomes erect under the impelling force of the leg spring 158. In so doing, it brings the keypad surface 122' into its raised position (FIG. 6*b*) without it having to be lifted by hand. In this position, the second limb 166 is supported on the front area 132' of the keypad surface 122' and thus limits the pivoting area of the support lever 160. In order to lower it, the keypad surface 122' is pressed downward manually. In this case, the lower end of the first limb 164 of the support lever slides along the cover plate 120 and tensions the leg spring 158 at the same time. As in the exemplary embodiment of the support device shown in FIG. 5, this arrangement also ensures that the keypad surface 122' can be changed from the raised to the lowered position (FIG. 6*a*) without much impact. Furthermore, it has the advantage of being able to be operated using one hand.

Figure 7:
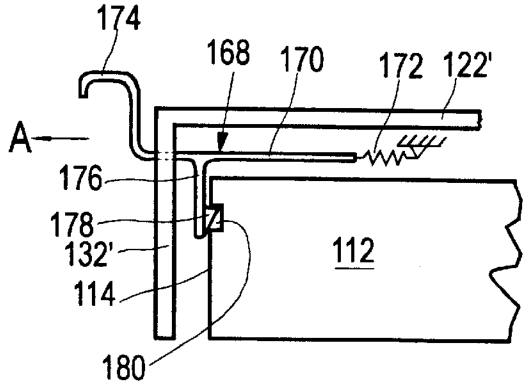
FIG. 7 shows a latching device for a keypad surface in a schematic side view.

FIG. 7 shows the latch 168 for the keypad surface 122' in a sectional side view. On the side of the keypad surface 122' which faces the casing 112, it includes a slide 170 which can slide longitudinally and which is aligned parallel to the keypad surface. The slide 170 penetrates the front area 132' of the keypad surface 122' where it is provided with a handgrip 174. On the inside of the front area 132', a tongue 176 which points downward is integrally formed on the slide 170 wherein a hook-shaped latching projection 178 is formed on the lower end of said tongue. In its latching position, this latching projection engages a latching recess 180 in the front panel 114 of the casing 112. The slide 170 is acted upon by an actuating force of a tension spring 172 exerted in the direction of the casing 112. For unlatching, the slide 170 is moved in the direction of the arrow A. The latching projection 178 disengages from the latching recess 180 and the keypad surface can swing upward.

The display and operating unit 109' shown at the top of FIG. 1 is not a second display and operating unit associated with the peripheral device kit 10. Instead, it is the same display and operating unit as described previously, the keypad surface 122 being equipped with a flat screen 26 and a keypad 30 with a small number of keys. The screen can be designed as a touch screen. However, it can also have a bar 28 having user-programmable keys, so-called soft keys, arranged at its edge, as shown in FIG. 1. In this equipment variant, the display device 107 is replaced by a further, snap-fit opening 188 for printed matter which is aligned with the exit point 25 for printed matter from the label printer 24.

Likewise, the base station 100' illustrated in FIG. 1 is not a second base station associated with the peripheral device kit 10. Instead, this is simply intended to show an equipment variant of the base station 100 with a weighing plate 104 incorporating the window 32 of a bar code reader. The indices on the reference numerals merely serve to make the description more comprehensible.

Although the present invention has been described with reference to specific embodiments, those of skill in the art will recognize that changes may be made thereto without departing from the spirit and scope of the invention as set forth in the hereafter appended claims.

What is claimed is:

1. A workstation of a goods invoicing system, comprising:

a goods invoicing computer;

a printer box having an exit point for printed matter;

a base box having a weighing plate mounted on a top side of the base box and having an exit point for printed matter;

a printer installed in one of the printer box and the base box, the printer producing cash register slips and price labels;

a display and operating unit including a display device and an input device and an opening for printed matter, the display and operating unit further including a rear panel having dimensions equal to front face dimensions of both the printer box and the base box, the display and operating unit mounted on the printer box when the printer is installed in the printer box wherein the opening is aligned with the exit point of the printer box, the display and operating unit mounted on the base box when the printer is installed in the base box wherein the opening is aligned with the exit point of the base box; and a supporting fixture mounted on a bearing fixture fitted to a rear side of the base box, the printer box and the display and operating unit fitted to the supporting fixture when the printer is installed in the printer box.

2. A workstation of a goods invoicing system as claimed in claim 1, wherein the display and operating unit includes first and second limbs, the first limb having a console-type keypad surface for at least one keypad, the second limb protruding beyond a rear edge of the at least one keypad and having a display device and/or at least one opening for printed matter.

3. A workstation of a goods invoicing system as claimed in claim 2, wherein the display and operating unit further includes a casing located beneath the keypad surface, the casing having a vertical front panel with at least one chip card reader and/or pass reader and/or floppy disk drive and/or optical storage media drive and/or a card holder complying with the PCMCIA standard, a front area of the keypad surface being bent downward, the keypad surface being mounted on the display and operating unit wherein it may pivot about a pivot axis running at and parallel to a rear edge of the keypad surface between a lowered position in which a front area of the keypad surface is engaged over the vertical front panel and a raised position in which the front area is disengaged.

4. A workstation of a goods invoicing system as claimed in claim 3, wherein the front area of the keypad surface is positioned between projections when the keypad surface is in the lowered position, the projections defining respective side edges of the front panel.

5. A workstation of a goods invoicing system as claimed in claim 4, wherein, at least at one side edge of the front area, a support is arranged which runs parallel to the adjacent projection when the keypad surface is in the lowered position and which, when the keypad surface is in the raised position, extends laterally away from the front area under action of an elastic spring force.

6. A workstation of a goods invoicing system as claimed in claim 3, wherein at least one support lever which is acted upon by the force of a spring in a direction of the casing, may be pivoted about a spindle oriented parallel to the pivot axis of the keypad surface, the support lever being connected to the underside of the keypad surface and having a limb supported on the cover plate of the casing.

7. A workstation of a goods invoicing system as claimed in claim 3, wherein the keypad surface may be latched to the casing when the keypad surface is in the lowered position.

8. A workstation of a goods invoicing system as claimed in claim 3, wherein the pivot axis of the keypad surface is arranged at a set distance from the information panel at a rear edge of a keypad casing protruding beyond the keypad surface does not collide with the information panel or a display device incorporated therein or any opening for printed matter incorporated therein when the keypad surface is in the raised position.

9. A workstation of a goods invoicing system as claimed in claim 8, wherein the keypad surface is formed from sheet metal and is bent around the pivot axis to form a channel in the shape of a segment of a circle, the channel pivotable in a gap formed between the cover plate of the case and a rib integrally formed on a floor part of the display and operating unit.

10. A workstation of a goods invoicing system as claimed in claim 1, wherein the goods invoicing computer is installed in the base box.

11. A workstation of a goods invoicing system as claimed in claim 1, wherein the weighing plate includes an integrated scanner window for a bar code reader.

12. A workstation of a goods invoicing system as claimed in claim 1, wherein a plug panel at the rear side of the base box is covered by a removable cable cover.

13. A workstation of a goods invoicing system as claimed in claim 1, wherein the bearing fixture covers a plug panel at the rear side of the base box.

14. A workstation of a goods invoicing system as claimed in claim 1, further comprising a vertical scanner mounted on the bearing fixture, the vertical scanner having a main scanning direction which includes an area lying above the base box.

* * * * *